(12) United States Patent
O'Connor et al.

(10) Patent No.: US 10,678,616 B2
(45) Date of Patent: *Jun. 9, 2020

(54) SYSTEM AND METHOD FOR ENCAPSULATING COMPUTER COMMUNICATIONS

(71) Applicant: MZ IP Holdings, LLC, Palo Alto, CA (US)

(72) Inventors: John O'Connor, Sunnyvale, CA (US); Nathan Spencer, Redwood City, CA (US); Garth Gillespie, Palo Alto, CA (US); Yan Zhang, Mountain View, CA (US)

(73) Assignee: MZ IP Holdings, LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/185,744

(22) Filed: Nov. 9, 2018

(65) Prior Publication Data

US 2019/0079813 A1    Mar. 14, 2019

Related U.S. Application Data

(63) Continuation of application No. 15/878,875, filed on Jan. 24, 2018, now Pat. No. 10,162,690.

(Continued)

(51) Int. Cl.
*G06F 9/54* (2006.01)
*G06F 9/48* (2006.01)
*G06F 9/448* (2018.01)

(52) U.S. Cl.
CPC ............ *G06F 9/546* (2013.01); *G06F 9/4484* (2018.02); *G06F 9/485* (2013.01); *G06F 9/541* (2013.01)

(58) Field of Classification Search
CPC ....................................................... G06F 9/541
See application file for complete search history.

(56) References Cited

U.S. PATENT DOCUMENTS 6,275,868 B1    8/2001 Fraley et al.
6,609,158 B1    8/2003 Nevarez et al.
(Continued)

FOREIGN PATENT DOCUMENTS

EP          2101474 A1     9/2009
WO      WO-2014/065826 A1  5/2014
WO      WO-2016/176058 A1  11/2016

OTHER PUBLICATIONS

Int'l Search Report and Written Opinion of the ISA/EP in PCT/US2018/015036; dated Apr. 23, 2018; 15 pgs.

(Continued)

*Primary Examiner* — Brian W Wathen
(74) *Attorney, Agent, or Firm* — Goodwin Procter LLP

(57) ABSTRACT

Implementations of the present disclosure are directed to a method, a system, and an article for binding computer languages. An example computer-implemented method includes: operating an application on at least one computer in a first computer language; operating a platform for the application on the at least one computer in a second computer language; binding the first computer language with the second computer language; and communicating between the application and the platform using the binding of the first computer language and the second computer language.

19 Claims, 6 Drawing Sheets

Related U.S. Application Data

(60) Provisional application No. 62/451,240, filed on Jan. 27, 2017.

(56) References Cited

U.S. PATENT DOCUMENTS

| | | | |
|---|---|---|---|
| 9,582,300 | B2 | 2/2017 | Martori et al. |
| 10,162,690 | B2* | 12/2018 | O'Connor ............... G06F 9/485 |
| 2002/0178141 | A1 | 11/2002 | Kushnirskiy |
| 2003/0105883 | A1 | 6/2003 | Gibbons |
| 2003/0225935 | A1 | 12/2003 | Rivard et al. |
| 2005/0183078 | A1* | 8/2005 | Shi ........................ G06F 9/4484 |
| | | | 717/149 |
| 2006/0200808 | A1 | 9/2006 | Kalidindi et al. |
| 2012/0303704 | A1 | 11/2012 | Schleifer et al. |
| 2015/0331727 | A1 | 11/2015 | Mameri et al. |
| 2016/0283492 | A1 | 9/2016 | Duminy et al. |

OTHER PUBLICATIONS

Jung, K.; Brown, A., "Beginning Lua Programming" (2007), Wiley Publishing Inc., pp. 1-644.
Vaswani, Vikram, "PHP: A Beginner's Guide" In: "PHP: A Beginner's Guide," Oct. 2009, McGraw-Hill Education.
Int'l Search Report and Written Opinion of the ISA/EP in PCT/US2019/036270; dated Aug. 2, 2019; 12 pgs.
Palozzi, L., "Lua: Technical Note 5—a Template Class for Binding C++ to Lua," Mar. 12, 2003, 6 pgs, available at: https://www.lua.org/notes/ltn005.html.
U.S. Appl. No. 16/436,071, filed Jun. 10, 2019, System and Method for Enabling Communication Between Disparate Computer Languages, O'Connor.

\* cited by examiner

SYSTEM AND METHOD FOR ENCAPSULATING COMPUTER COMMUNICATIONS

CROSS-REFERENCE TO RELATED APPLICATIONS

This application is a continuation of U.S. application Ser. No. 15/878,875, filed Jan. 24, 2018, which claims the benefit of U.S. Provisional Patent Application No. 62/451,240, filed Jan. 27, 2017, the entire contents of each of which are incorporated by reference herein.

BACKGROUND

The present disclosure relates to communications between two or more computer languages on one or more computers and, in some examples, to systems and methods for binding two computer languages together to achieve such communications.

In general, it can be desirable to communicate between computer programs written in different languages. In some instances, for example, a software application written in one language may be required to obtain information from or send information to another software application written in a different language. One of the software applications in such an instance can operate or provide certain functions or features (e.g., a database) for the other software application.

Attempts have been made to bind certain computer languages together to facilitate communications. Such attempts have been difficult or unsuccessful for some language combinations, however, particularly when the languages treat data types differently (e.g., first-class or second-class data types) and/or provide different support for coroutines or multi-tasking.

SUMMARY

In general, the systems and methods described herein relate to communications between computer programs written in different computer languages. The systems and methods can achieve, for example, an extension of a first computer language that provides binding support for a second computer language. In some implementations, the extension can be achieved by encapsulating a state of the second computer language into the first computer language and using the encapsulated state to communicate between the two computer languages. Additionally or alternatively, the second computer language can be extended with the first computer language, for example, by exposing the second computer language to classes, functions, constants, globals, and/or other types in libraries for the first computer language.

Advantageously, the systems and methods can enable a computer program or combination of computer programs to take advantage of useful features available in one computer language (e.g., speed and/or flexibility) while having access to helpful resources available in the other language (e.g., a database and/or certain libraries). Additionally or alternatively, the systems and methods can allow a new computer program written in one computer language to communicate with an older computer program written in a different computer language. This can avoid any time and/or expense associated with rewriting the older computer program, for example, to be in the same language as the new program.

Further, the systems and methods can enable abstracting two different programming languages (e.g., C++ and PHP) that can be executed in different platforms to provide a common language environment (e.g., Lua), in which the common language can be shared and executed on the different platforms. This can increase engineer programming efficiency and decrease potential issues caused by use of multiple languages.

In one aspect, the subject matter described in this specification relates to a computer-implemented method. The method includes: operating an application on at least one computer in a first computer language; operating a platform for the application on the at least one computer in a second computer language; binding the first computer language with the second computer language; and communicating between the application and the platform using the binding of the first computer language and the second computer language.

In certain examples, the at least one computer can include at least one of a plurality of client devices and a server. The at least one computer can include a single computer, and the single computer can be configured to operate the application and the platform. The single computer can include one of a client device and a server. The first computer language and the second computer language can include Lua and PHP. For example, the first computer language can be or include Lua and the second computer language can be or include PHP.

In some implementations, binding the first computer language with the second computer language can include: using the first computer language to extend the second computer language; and using the second computer language to extend the first computer language. The platform can include a database having data for the application. One of the first and second computer languages can support coroutines. Communicating between the application and the platform can include: executing a coroutine thread in the one of the first and second computer languages; and tracking the coroutine thread in another one of the first and second computer languages.

In another aspect, the subject matter described in this specification relates to a system. The system includes one or more computer processors programmed to perform operations including: operating an application on at least one computer in a first computer language; operating a platform for the application on the at least one computer in a second computer language; binding the first computer language with the second computer language; and communicating between the application and the platform using the binding of the first computer language and the second computer language.

In certain examples, the at least one computer can include at least one of a plurality of client devices and a server. The at least one computer can include a single computer, and the single computer can be configured to operate the application and the platform. The single computer can include one of a client device and a server. The first computer language and the second computer language can include Lua and PHP. For example, the first computer language can be or include Lua and the second computer language can be or include PHP.

In some implementations, binding the first computer language with the second computer language can include: using the first computer language to extend the second computer language; and using the second computer language to extend the first computer language. The platform can include a database having data for the application. One of the first and second computer languages can support coroutines. Communicating between the application and the platform can include: executing a coroutine thread in the one of the first and second computer languages; and tracking the coroutine thread in another one of the first and second computer languages.

In another aspect, the subject matter described in this specification relates to an article. The article includes a non-transitory computer-readable medium having instructions stored thereon that, when executed by one or more computer processors, cause the computer processors to perform operations including: operating an application on at least one computer in a first computer language; operating a platform for the application on the at least one computer in a second computer language; binding the first computer language with the second computer language; and communicating between the application and the platform using the binding of the first computer language and the second computer language.

Elements of embodiments described with respect to a given aspect of the invention can be used in various embodiments of another aspect of the invention. For example, it is contemplated that features of dependent claims depending from one independent claim can be used in apparatus, systems, and/or methods of any of the other independent claims

DETAILED DESCRIPTION

Figure 1:
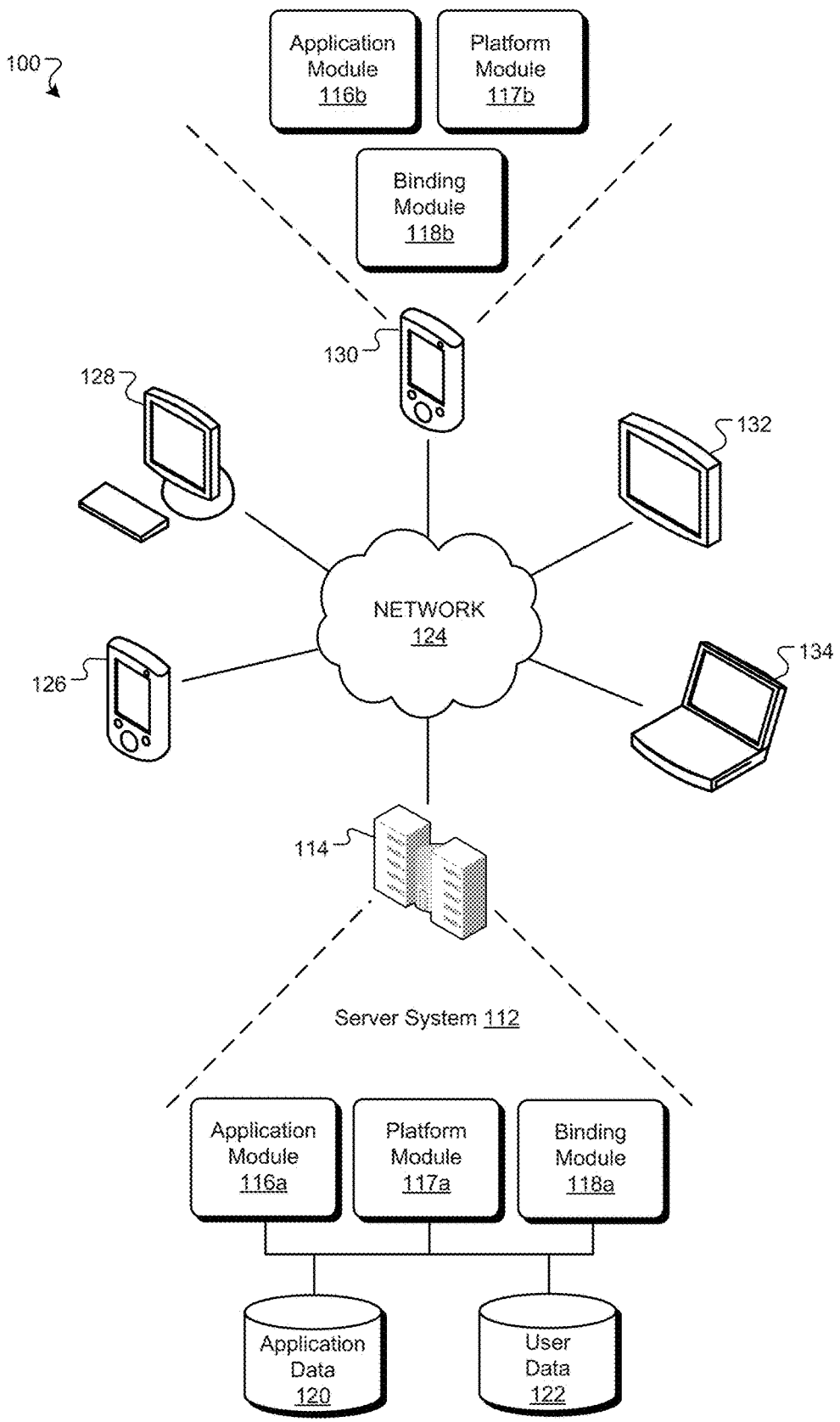
FIG. 1 is a schematic diagram of an example system for achieving communications between software applications written in different computer languages.

FIG. 1 illustrates an example system 100 for achieving communications between software applications written in different computer languages. A server system 112 provides functionality for binding two or more computer languages together. The server system 112 includes software components and databases that can be deployed at one or more data centers 114 in one or more geographic locations, for example. The server system 112 software components can include an application module 116a, a platform module 117a, and a binding module 118a. The software components can include subcomponents that can execute on the same or on different individual data processing apparatus. The server system 112 databases can include application data 120 and user data 122 databases. The databases can reside in one or more physical storage systems. The software components and data will be further described below.

An application, such as, for example, a web-based application, can be provided as an end-user application to allow users to interact with the server system 112. The end-user application can be accessed through a network 124 (e.g., the Internet) by users of client devices, such as a smart phone 126, a personal computer 128, a smart phone 130, a tablet computer 132, and a laptop computer 134. Other client devices are possible. Each client device can include suitable software components and storage devices or databases for providing game functionality. The client device software components can include, for example, an application module 116b, a platform module 117b, and a binding module 118b. While FIG. 1 depicts the application module 116b, the platform module 117b, and the binding module 118b as being associated with the client device 130, it is understood that each of the client devices 126, 128, 130, 132, and 134 can include the application module 116b, the platform module 117b, the binding module 118b, or any portions thereof. In some implementations, the application data 120 and/or the user data 122 or any portions thereof can be stored on one or more client devices.

FIG. 1 depicts the application module 116a, the platform module 117a, and the binding module 118a as being able to communicate with the databases (e.g., the application data 120 and the user data 122 databases). The application data 120 database generally includes data related to a software application installed on a client device and/or the server system 112. The software application can be or include an application that provides or relates to, for example, music, video, computer games, news, maps, weather, and the like. In the context of a computer game application, for example, the application data 120 database can include information related to a virtual environment for the game, image, video and/or audio data for the game, event data corresponding to previous, current or future game events, and/or game state data defining a current state of the game. The user data 122 database generally includes data related to user interactions with the software application. Such information can be or include, for example, a history of user connections to the system 100, user purchases, user accomplishments, user preferences, user tasks, and/or user interactions with other users (e.g., group chats).

In various examples, the software application can be implemented on the server system 112 and the client devices 126, 128, 130, 132, and 134 using the application modules 116a and 116b, respectively, and can exchange data with a platform application implemented using the platform modules 117a and 117b. The platform application can be configured to provide support for the software application, for example, by accessing or operating one or more databases (e.g., the application data 120 and the user data 122 databases) that provide information used by the software application. Additionally or alternatively, the platform application can be used to facilitate communications between the server system 112 and the client devices 126, 128, 130, 132, and 134.

The software application implemented on the server system 112 is preferably identical or similar to the software application implemented on the client devices 126, 128, 130, 132, and 134. For example, in the context of a multiplayer online game, the server system 112 and the client devices 126, 128, 130, 132, and 134 can be configured to run identical or similar versions of the online game. In some instances, however, the application modules 116a and 116b can be implemented using different computer languages and/or can implement the software applications using different computer languages. For example, the application module 116a on the server can be implemented using a first computer language, and the application module 116b on the client devices 126, 128, 130, 132, and 134 can be implemented using a second computer language. Example computer languages for the software application can include, for example, PHP, Lua, C, ERLANG, PYTHON, JAVA, RUBY, JAVASCRIPT, C#, OBJECTIVE-C, and SQL. Many other computer languages are possible.

Additionally or alternatively, the platform application implemented on the server system 112 can be identical or similar to the platform application implemented on the client devices 126, 128, 130, 132, and 134. For example, in the context of a multiplayer online game or other applications, the server system 112 and the client devices 126, 128, 130, 132, and 134 can be configured to run identical or similar platform applications. In some instances, however, the platform modules 117a and 117b can be implemented using different computer languages and/or can implement the platform applications using different computer languages. For example, the platform module 117a on the server can be implemented using a first computer language, and the platform module 117b on the client devices 126, 128, 130, 132, and 134 can be implemented using a second computer language. Example computer languages for the platform application include, for example, PHP, Lua, C, ERLANG, PYTHON, JAVA, RUBY, JAVASCRIPT, C#, OBJECTIVE-C, and SQL. Many other computer languages are possible.

Figure 2:
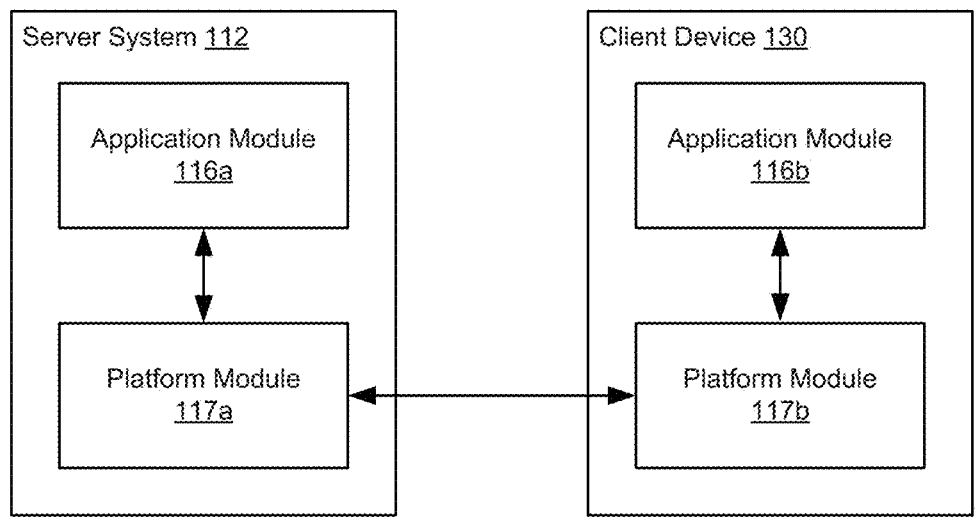
FIG. 2 is a schematic diagram of an example server system and a client device in communication with one another.

Referring to FIG. 2, in certain examples, the application modules 116a and 116b on the server system 112 and the client devices (e.g., the client device 130), respectively, can be in communication with respective platform modules 117a and 117b. For example, the application module 116a can send data to and receive data from the platform module 117a on the server system 112. Likewise, the application module 116b can send data to and receive data from the platform module 117b on the client device 130. Additionally or alternatively, the platform module 117a on the server system 112 can be in communication with the platform module 117b on the client device 130. To send a request or other data from the application module 116b to the application module 116a, for example, the application module 116b can send the request or data (or instructions for the request or data) to the platform module 117b, which can forward the request or data to the platform module 117a, which can then forward the request or data to the application module 116a. Likewise, to send a request or other data from the application module 116a to the application module 116b, the application module 116a can send the request or data (or instructions for the request or data) to the platform module 117a, which can forward the request or data to the platform module 117b, which can then forward the request or data to the application module 116b.

As described herein, the application modules 116a and 116b and the platform modules 117a and 117b can be implemented in different computer languages and/or can implement the software applications and the platform applications in different computer languages. The use of different computer languages can have certain advantages and disadvantages. For example, when a computer program is already implemented and working properly in one language, it may not be desirable reprogram the computer program in a different language. Additionally or alternatively, a computer program may perform better and/or be easier to implement or maintain in one computer language compared to another. The use of different computer languages can present certain difficulties, however, particularly when applications written in different languages are required to exchange information or otherwise communicate with one another. For example, when one or more of the application modules 116a and 116b and the platform modules 117a and 117b are implemented in a unique computer language, communication between and among the application modules 116a and 116b and the platform modules 117a and 117b can be more difficult.

To facilitate such communications, or to make such communications possible, certain implementations of the systems and methods described herein can bind two or more computer languages together. To achieve a binding of a first computer language to a second computer language, for example, the first computer language can be used to extend the second computer language and/or the second computer language can be used to extend the first computer language. In various examples, the first and second computer languages can be PHP and Lua, though other languages can be used. For example, the approach described herein for binding PHP and Lua can be used for systems in which only one of the computer languages is PHP or Lua, or for systems in which none of the computer languages is PHP or Lua.

Figure 3:
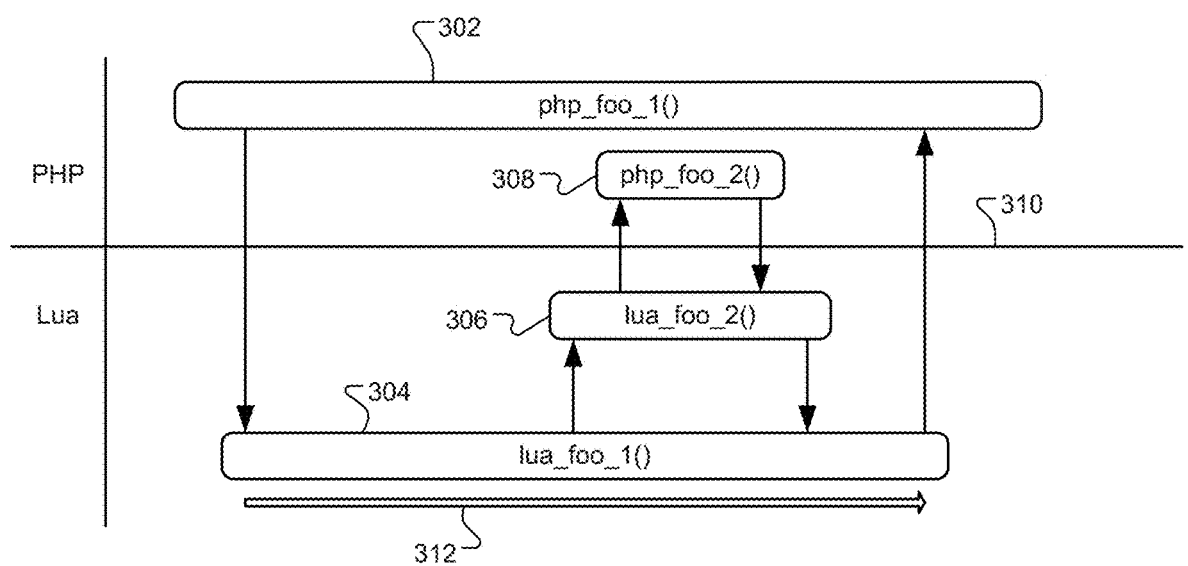
FIG. 3-5 are schematic diagrams showing a flow of communications between two computer languages, in accordance with certain examples of this disclosure.
Figure 4:
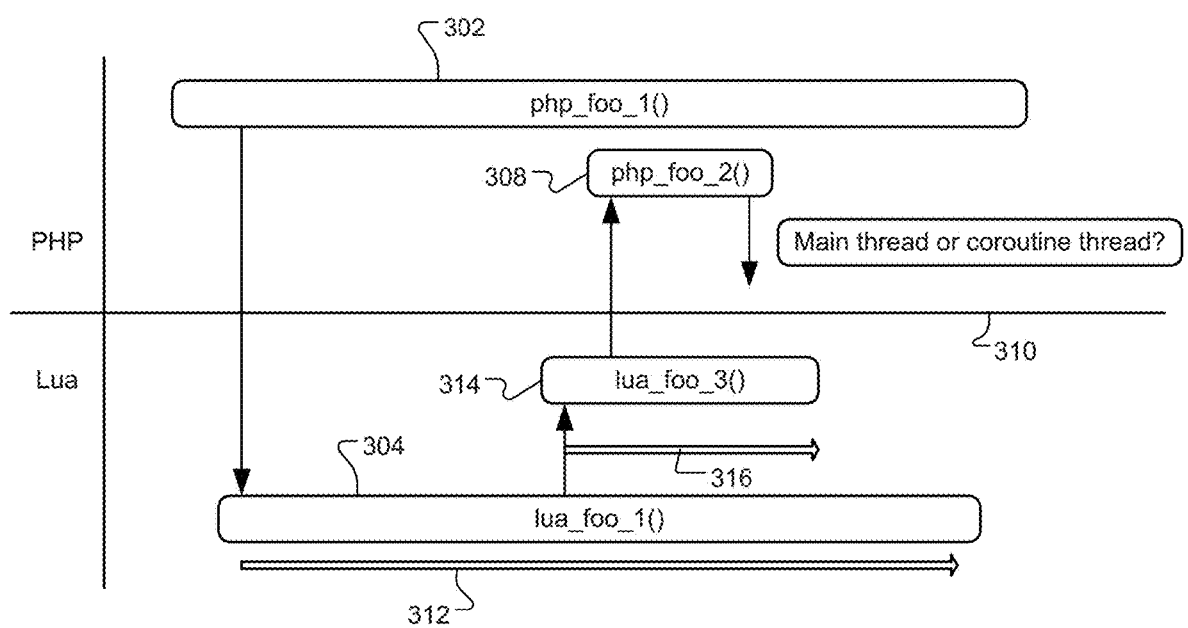
Figure 5:
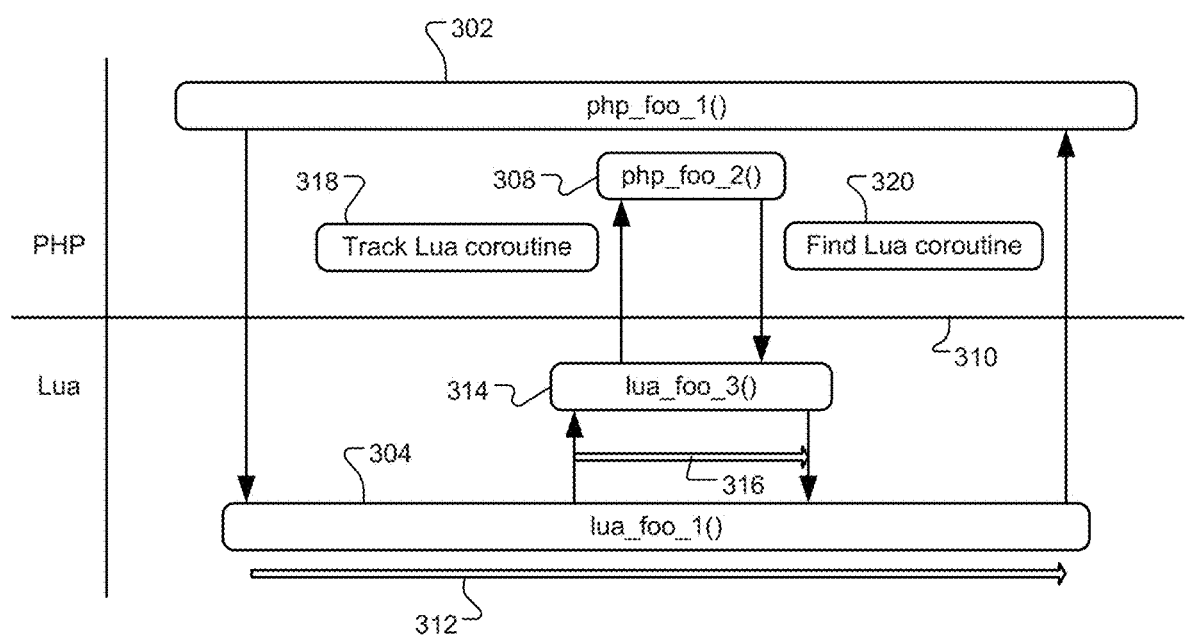

FIGS. 3-5 illustrate an example in which a computer program written in PHP is in communication with a computer program written in Lua. One characteristic that can make the binding of PHP and Lua difficult is a coroutine feature that can be available in Lua but not available in PHP. In general, a coroutine in Lua is a block of code that can run until the block of code activates a different coroutine or yields. By passing control between coroutines repeatedly over time, in a controlled manner, multitasking can be achieved, such that several tasks can be executed at once.

In certain implementations, to support traversing a boundary between Lua and PHP in the context of a Lua coroutine, certain tracking mechanisms can be implemented that record a current Lua coroutine thread. This way, when code or a process needs to resume a previously created Lua thread from PHP, the code can identify and locate the desired Lua thread. For example, referring to FIG. 3, a PHP function 302 (depicted as "php_foo_1( )") can call a Lua subroutine 304 (depicted as "lua_foo_1( )"), which can call a Lua subroutine 306 (depicted as "lua_foo_2( )"), which can call a PHP subroutine 308 (depicted as "php_foo_2( )"). A boundary 310 between PHP and Lua can be crossed multiple times in this scenario. Each time PHP crosses the boundary 310, PHP can use a context of Lua's main thread 312, given that no Lua coroutine thread has been created.

Referring to FIG. 4, in an alternative example, if the Lua subroutine 306 is replaced by a Lua coroutine 314 (depicted as "lua_foo_3( )"), then Lua can have the main thread 312 and a coroutine thread 316 created by the Lua coroutine 314. If there is no thread tracking in this scenario, PHP (e.g., the PHP subroutine 308) may not be aware of the coroutine thread 316 and may instead refer or go to the Lua main thread 312 when crossing the boundary 310. If thread tracking is used, however, PHP can identify a current Lua thread (e.g., an active coroutine thread) and can determine how to return to the current Lua thread. Referring to FIG. 5, for example, when the Lua coroutine 314 calls the PHP subroutine 308, the coroutine thread 316 can be tracked (step 318). When the PHP subroutine 308 crosses the boundary 310 back to Lua, the thread tracking allows the coroutine thread 316 to be found (step 320). In various examples, the coroutine thread 316 and similar threads can be tracked by passing information related to the coroutine thread 316 (e.g., a thread address or identifier) across the boundary 310 to PHP, such that PHP can identify the coroutine thread 316 when the boundary 310 is crossed again.

Lua thread tracking can be achieved, for example, by managing a stack data struct. Before crossing the boundary 310 from Lua to PHP in the Lua coroutine 314, a thread address for the coroutine thread 316 can be pushed to a top of a managed stack. When the execution returns from PHP to Lua, the thread address can be retrieved from the stack and the coroutine thread 316 can be recovered. Advantageously, by maintaining a stack instead of a thread variable for tracking, multiple coroutine threads can be created and multiple traversals of the boundary 310 can be achieved along a code execution path.

In various implementations, the binding module 118a and/or 118b can include or achieve a PHP extension that provides Lua language binding support. For example, the binding module 118a and/or 118b can include or provide APIs for creating and/or encapsulating a Lua state, and communicating with Lua through this Lua state, thereby extending the PHP language with Lua. In some instances, for example, the Lua state can be or include an entire state of a Lua interpreter. The Lua state can define and maintain a Lua program's environment, including values for any parameters used in the environment. By encapsulating the Lua state, PHP can obtain or determine the Lua environment used to interact with Lua. This allows PHP to pass certain responsibilities to Lua, thereby extending PHP with Lua. For example, if an algorithm is slow to run in PHP, the approach described herein can take advantage of Lua's generally faster execution speed, by creating a Lua program to run the algorithm instead. Alternatively or additionally, classes, functions, constants, and globals in PHP libraries can be exposed to Lua through a set of Lua APIs (e.g., written in C), from which Lua can be extended with PHP library support.

Advantageously, by binding PHP and Lua together using the binding module 118a and/or 118b, systems can be developed in fast Lua code while retaining access to helpful resources offered by PHP. For example, a ZEND ENGINE PHP interpreter and numerous PHP extensions can create a huge ecosystem for web development. Additionally, Lua is generally a smaller and more flexible language. With support from LuaJIT, for example, a JIT compilation at runtime can allow faster script execution. In some instances, in a server I client development cycle and when the client is using Lua scripting, Lua for a server system can provide a benefit of sharing server I client agnostic systems with similar or identical logic.

In various instances, PHP can communicate with Lua through a LuaState instance. Internally, the LuaState instance can encapsulate a lua_State*struct pointer, from which Lua code can be accessed and executed. For example, the following PHP snippet can execute a chunk of Lua code (local a=1):

$L=new LuaState;
$L->dostring("local a=1");.

There are various LuaState APIs that can allow PHP to interact with Lua in different ways. For example, LuaObject LuaState::loadfile(string $file_path) is an API that can be used to load a given file as a Lua chunk and then return a LuaObject instance to represent a compiled Lua chunk. The returned LuaObject instance can be a PHP representation of a Lua function that can be passed around and called at a later time. "$file_path" can be or include a path of the file to be loaded. The following is an example use of this API:

$L=new LuaState;
$arg1=//some php value
$arg2=//some php value
$func_foo=$L->loadfile("file_foo.lua");
$func_foo($arg1, $arg2);

Additionally, LuaObject LuaState::loadstring(string $str) is an API that can load a string, where "$str" is the string to be loaded as a Lua chunk. This API can return a LuaObject object that references a Lua function. The following is an example use of this API:

$L=new LuaState;
$arg1=//some php value
$arg2=//some php value
$func_foo=$L->loadstring("local a=1");
$func_foo($arg1, $arg2);

Additionally, mixed LuaState::dofile(string $file_path [,mixed $ . . . ]) is an API that can load a given file as a Lua chunk and immediately execute the Lua chunk. "$file_path" in this case is a path of the file to be loaded and "$ . . . " is a variable list to be passed to the Lua chunk as arguments. The API can return the result of the Lua chunk execution. The following is an example use of this API:

$L=new LuaState;
$arg1=//some php value
$arg2=//some php value
$result=$L->dofile("file_foo.lua", $arg1, $arg2);

Mixed LuaState::dostring(string $str [, mixed $ . . . ]) is an API that can load and execute a string, where "$str" is a string to be loaded as a Lua chunk and "$ . . . " is a variable list to be passed to the Lua chunk as arguments. The API can return the result of the Lua chunk execution. The following is an example use of this API:

$L=new LuaState;
$arg1=//some php value
$arg2=//some php value
$result=$L->dofile("local args= . . . ", $arg1, $arg2);

Mixed LuaState::call(mixed $lua_callable [, mixed $ . . . ]) is an API that can call any PHP variable that can be called as a Lua callable, such as, for example, a LuaObject variable which represents a Lua function. "$lua_callable" is the Lua callable to be called and "$ . . . " is a variable list to be passed to the Lua callable as arguments. The API can return the result of the Lua callable execution. The following is an example use of this API:

$L=new LuaState;
$func_foo=$L->loadstring("local a= . . . ");
$L->call($func_foo, arg1, arg2);

LuaObject LuaState::table(array $arr) is an API that can convert a PHP array to a Lua table, and return the Lua table as a LuaObject instance, where "$arr" is the PHP array to be converted. The API can return an object that references the result Lua table. The following is an example use of this API:

$L=new LuaState;
$arr=['a'=>1];
$lua_table=$L->table($arr);

LuaObject LuaState:: get(string $key) is an API that can enable a Lua global table to be accessed from PHP. Syntax for a Lua global table lookup can be $L->G, with $L being a LuaState instance. "$key" is equal to a string 'G'. The API can return a LuaObject object that references the Lua global table G. The following is an example use of this API:

$L=new LuaState;
$print=$L->G->print;
$print("hello world");

Boolean LuaState::sethook_tideways( ) is an API that can set up a tideways profiling hook if a tideways extension is available and enabled. In general, tideways is a PHP profiling tool for profiling PHP functions. By calling sethook tideways, Lua calls associated with the LuaState are profiled along with PHP calls. The API can return "true" if the hook is successfully set and can otherwise return "false." The following is an example use of this API:

$L=new LuaState;
//enable tideways profiling tideways enable(TIDEWAYS_FLAGS_MEMORY)
$L->sethook_tideways( ).

Using the APIs and methods described herein, PHP can retrieve a Lua variable and store it as a PHP variable. For example, LuaState::loadstring can return a Lua function that is wrapped in a LuaObject object. Table 1, below, lists Lua data types and corresponding PHP representations of the data types.

TABLE 1

PHP representations of Lua types

| Lua Type | PHP Type |
| --- | --- |
| Nil | NULL |
| Boolean | Boolean |
| Number | Integer or Double |
| String | String |
| Userdata (converted from a PHP object, array, or resource) | Original PHP type |
| Userdata (converted from a PHP class) | String (the class name) |
| Userdata (all other types) | Null (no PHP form) |
| Table, function, lightuserdata, thread | PHP class LuaObject (keeps a reference of the original Lua value) |

If a LuaObject instance references a Lua function, the Lua function instance can be called in the PHP context, as follows:

$lua_func=$L->dostring("return {a=1, b=2}");
$lua_table=$lua_func( ).

Alternatively, if a LuaObject instance references a Lua table, elements of the Lua table can be accessed similar to a PHP array, as follows:

$lua_func=$L->dostring("return {a=1, b=2}");
$lua_table=$lua_func( );
local a=lua_table.a;

In various implementations, to extend Lua with PHP, the binding module 118a and/or 118b can expose PHP resources through a "php" Lua library. The "php" Lua library can provide a few entry points for accessing PHP functions, classes, constants, and/or globals. For example, PHP functions can be retrieved through a php.func utility. The following example Lua snippet can access a PHP function called var_dump:

local var_dump=php.func.var_dump
var_dump("hello world").

The php.func utility can also be called directly. As a result, available PHP functions can be cached into a "_php" Lua library and can be accessed directly from the "_php" Lua library after the caching. The following example Lua code snippet can cache all PHP functions and can later access var_dump directly through php:

php.func( )
php.var_dump("hello world").

An attempt to define new PHP functions to the "_php" Lua library can throw a Lua error, as follows:

local var_dump=php.func.var_dump
php.func.new_var_dump=var_dump
--error: "attempting to set php.func.new_var_dump!".

Additionally, methods of accessing PHP classes bear some resemblance to accessing PHP functions, though a php.class utility (rather than the php.func utility) can be called. For example, the following can be used to retrieve a PHP class stdClass:

local std_class=php.class.stdClass.

Just like php.func can be directly called for caching PHP functions, php.class can also be called to cache PHP classes to PHP. An attempt to define new PHP classes to the "_php" Lua library can throw a Lua error.

Likewise, PHP constants can be accessed with the help of a php.const utility. For example, assuming there is a PHP constant FOO, the PHP constant can be accessed in Lua with the following:

local foo=php.const.FOO.

To cache all the PHP constants in PHP, php.const can be called as follows:

php.const( )
local foo=php.FOO.

Unlike functions and classes, new PHP constants can be defined from Lua as follows:

php.const.BAR="bar"

Once defined, the constant bar can be accessed from both PHP and Lua.

In PHP, global variables can be referenced in PHP's superglobal variable $GLOBALS. Similar to how global variables can be retrieved or created in $GLOBALS, PHP global variables can be retrieved or created in Lua with php.global. For example, the following code can be used to retrieve the global variable $foo and then add a new global variable $bar:

local foo=php.global.foo
php.global.bar='bar'.

In certain examples, cached PHP functions, classes, or constants can be accessed directly through PHP, instead of going individually through php.func, php.class, or php.const. To extend this, without knowing which category to access, all that PHP offers can be accessed through PHP directly. If the item is not cached in PHP previously, PHP can look up the item in the order of php.func, php.class, php.const, php.global, and PHP to find the requested symbol from the potential categories. For example, if a global variable $foo is not cached in PHP, then a php.foo request can query through php.func, php.class, and php.const, and can eventually find the item with php.global. On the other hand, defining a new entry in PHP can have the same effect of defining a new entry through php.global. PHP can also be called directly, which can have the same effect of combining caching of PHP functions, classes, constants, globals, and PHP all together.

While the "php" Lua library can offer four categories of utilities and PHP entry points, this library can be mainly a wrapper around the "_php" C library, which can be provided by the binding module 118a and/or 118b. In addition to facilitating access to PHP resources in Lua, the "_php" C library can provide certain built-in APIs that extend Lua's capability of accessing PHP. The following is a list of APIs that can be defined in the "_php" C library and wrapped by the "php" Lua library.

php.array( . . . ) can be used to create and return a PHP array as Lua value, where " . . . " are the variables to be filled into the PHP array. php.array can return Lua userdata through which the created PHP array can be accessed. The following is an example: local php_arr=php.array(1, 2, 3).

php.callable(anything) can be used to return a C closure for a given argument. If the argument is a PHP callable, the execution of the returned C closure can have the same effect as if the PHP callable were executed. Alternatively or additionally, if the argument is not a PHP callable, an error can be triggered. Anything that PHP can use as a callable can be used as a callable. php.callable can return a C closure that can be called as the PHP callable. The following is an example use of this method:

local php_callable='var_dump'
local var_dump=php.callable(php_callable)
var_dump("hello world").

php.class(cls name) can be used to retrieve the PHP class for the given PHP class name, where "cls_name" can be a name of a PHP class. php.class can return Lua userdata through which the PHP class can be accessed. The following is an example use of this method: local std_class=php.class ('stdClass').

php.eval(php str) can be used to evaluate and execute a given PHP string, where "php_str" is a string to be evaluated by PHP. This function can be defined as an API of PHP instead of accessing through php.callable, because eval can be a language construct and not a function, and eval may not be accessed as a callable through php.callable. The following is an example use of this method: php.eval("$a='hello world';").

php.throw(exc msg) can be used to throw a LuaErrorException with a given message, where "exc_msg" is a Lua string or Lua userdata that can be converted by PHP to string. This string can be used as a message for the LuaErrorException. The following is an example use of this method: php.throw("error message").

php.call(php_callable, . . . ) can be used to call a PHP callable with arguments, where "php_callable" is a PHP callable to call and " . . . " are arguments that can be passed to the PHP callable. php.call can return a result of the PHP call. The following is an example use of this method: local max_num=php.call("max", php.array(1, 2, 3)).

php.tostring(any) can be used to convert a given Lua value to a PHP value, and use PHP's tostring conversion to convert the value to string. "any" is a value of any Lua type to be passed to PHP for the tostring conversion. php.tostring can return a result of the PHP tostring conversion. The following is an example use of this method: local php.tostring(php.array(1, 2, 3)). This can output an 'E_NOTICE: Array to string conversion' notice.

php.totable(php_arr, recursive) can be used to convert a given PHP array to a Lua table, where "php_arr" is a PHP array to be converted and "recursive" indicates whether or not the conversion should be recursive. php.totable can return the resulting Lua table. The following is an example: php.totable(php.array(1,2,3)).

php.toassoc(lua_table, recursive) can be used to converts a Lua table to a PHP array, where "lua_table" is the Lua table to be converted and "recursive" indicates whether or not the conversion should be recursive. php.toassoc can return userdata through which the resulting PHP array can be accessed. The following is an example use of this method: local php_arr=php.toassoc({1, a='2'}).

php.tovalues(lua_table, recursive) can be used to convert a given Lua table to a PHP array, where "lua_table" is the Lua table to be converted and "recursive" indicates whether or not the conversion should be recursive. php.tovalues is similar to php.toassoc, except that php.tovalues can ignore entries that do not have a numeric key. php.tovalues can return userdata through which the resulting PHP array can be accessed. The following is an example use of this method: local php_arr=php.tovalues({1, a='a', 2}).

php.issetglobal(symbol) can be used to determine if a given global name or symbol is set in PHP, where "symbol" is a name to be checked by PHP. php.issetglobal can return true if the given symbol is a PHP global symbol and can otherwise return false. The following is an example use of this method: php.issetglobal ('global_variable').

php.getglobal(symbol) can be used to retrieves a PHP global variable, where "symbol" is a name of the PHP global variable. php.getglobal can return a Lua form of the PHP global variable. The following is an example use of this method: php.getglobal('global_variable').

php.setglobal(symbol, value) can be used to set a value of a PHP global variable, where "symbol" is a name of the PHP global variable to be set and "value" is a value to be assigned to the given PHP global variable. The following is an example use of this method: php.setglobal('global_variable', 'global_variable_value').

php.unsetglobal(symbol) can be used to unset a value of a PHP global variable, where "symbol" is a name of the PHP global symbol to be unset. The following is an example use of this method: php.unsetglobal('global_variable').

In certain instances, when a PHP class is retrieved from Lua with the help of the "_php" C library for the first time, a few metamethods can be setup for the PHP class to facilitate interaction with the class. Metamethods are functions that are called when a specific event occurs. These metamethods and their usage can include the following.

_call is a metamethod that can enable a direct call on the Lua PHP class to create a PHP object of the given class type. For example, the following Lua code can be used to retrieve a "stdClass" class and create an instance of this class:
    local std_class=php.stdClass
    --direct call on "std_class" triggers the_call metamethod
    assert(std_class( )~=nil).
In certain examples, this Lua code can be equivalent to $std_class_obj=new stdClass( ).

_eq is a metamethod that can allow the comparing of two PHP classes and can yield the same or similar results as the comparison would generate in PHP.
    local std_class1=php.stdClass
    local std_class2=php.stdClass
    --comparing "std_class1" with "std_class2" triggers the_eq metamethod
    assert(std_class1==std_class2)
    local foo_class=php.Foo
    assert(std_class1~=foo_class)
_index is a metamethod that can enable the retrieval of static properties for a given PHP class.
    local std_class=php.stdClass
    assert(std_class.foo==nil)
    std_class.foo='foo'
    --accessing the "foo" property in "std_class" triggers the_index metamethod
    assert(std_class.foo=='foo')
_newindex is a metamethod that can enable the setting of static properties for a given PHP class.
    local std_class=php.stdClass
    assert(std_class.foo==nil)
    --assigning value "foo" to property "foo" in "std_class" triggers the_newindex metamethod
    std class.foo='foo'
    assert(std_class.foo=='foo')
_tostring is a metamethod that can customize the to string conversion with the tostring Lua function. This can output a standard string "php-class: [classname]."

In various implementations, a PHP object can be created or retrieved by interacting with PHP methods in Lua. For example, the std_class_obj in the call example, above, can be a PHP object in Lua form.

In some examples, a few metamethods can be assigned to a Lua PHP object. For example, _len is a metamethod that can allow calculating a size of a PHP object with the operator #, similar to how a size of a Lua table can be calculated. If a Countable::count is implemented by a PHP object, it can be used for counting; otherwise, the size can be 1.

--'stdClass' does not have 'Countable:: count' implemented, therefore the count of a
'stdClass' is always 1
local std_obj=php.stdClass( )
assert(#std_obj==1) std_obj.foo='foo'
assert(#std_obj==1)
std_obj[1]='bar'
assert(#std_obj==1)
--assuming PHP class 'Foo' has two non-static properties.
local foo_obj=php.Foo( )
--call operator "#" on "foo_obj" triggers the_len metamethod
assert(#foo_obj==2)
_eq is a metamethod that can allow the comparing of two PHP objects and can yield the same results as a comparison that occurs in PHP.
local std_obj1=php.stdClass( )
local std_obj2=php.stdClass( )
--comparing "std_obj1" with "std_obj2" triggers the_eq metamethod
assert(std_obj1==std_obj2)
local foo_obj=php.Foo( )
assert(std_obj1~=foo_obj)
_index is a metamethod that can enable a retrieval of properties for a given PHP object.
local std_obj=php.stdClass( )
--accessing the "foo" property in "std_obj" triggers the_index metamethod
assert(std_obj.foo==nil)
std_obj.foo='foo'
assert(std_obj.foo='foo')
_newindex is a metamethod that can enable a setting of properties for a given PHP obj ect.
local std_obj=php.stdClass( )
assert(std_obj.foo==nil)
--assigning value "foo" to property "foo" in "std_obj" triggers the_newindex metamethod
std_obj.foo='foo'
assert(std_obj.foo='foo')
_tostring is a metamethod that can customize a to string conversion with the tostring Lua function. If the PHP object has a tostring magic method implemented, then this method can be used for the tostring conversion. Otherwise, it can output a standard default string "php-object: stdClass #[object handle]."
--Foo have "_tostring" implemented, which returns a string
--"I am an object of Foo".
local foo_obj=php.Foo( )
--calling "tostring( )" on "foo_obj" triggers the_tostring metamethod
assert(tostring(foo_obj)=="I am an object of Foo")
--stdClass does not have "tostring" implemented
local std_obj=php.stdClass( )
assert(tostring(std_obj)=="php-object: stdClass #132")
_gc is a metamethod that can customize a garbage collection for the associated Lua PHP object.
In some examples, a PHP array can be represented in a Lua variable. Like PHP class and object, metamethods can also be used to help interact with a Lua PHP array.
For example, _call is a metamethod that can allow a direct call on a Lua PHP array, and/or a PHP array can serve as an iterator in a for loop with the help of this metamethod. The following is an example.
local php_arr=php.array(1, 2, 3)
--calling "php_arr" triggers the_call metamethod
for_, value in php_arr( )do print(value)
end
--outputs:
—1
—2
—3
_len is a metamethod that can allow a size of a PHP array to be calculated, for example, using an operator #, similar to how the size of a Lua table can be calculated.
local php_arr=php.array(1)
--call operator "#" on "php_arr" triggers the_len metamethod
assert(#php_arr==1)
php_arr.foo='foo'
assert(#php_arr==2)
php.arr[1]='bar'
assert(#php_arr==3)
_eq is a metamethod that can be used to compare two PHP arrays and can yield the same results as if the comparison were performed in PHP.
local php_arr1=php.array(1, 2, 3)
local php_arr2=php.array(1, 2, 3)
--comparing "php_arr1" with "php_arr2" triggers the eq metamethod
assert(php_arr1==php_arr2)
local php_arr3=php.array(2, 3, 4)
assert(php_arr1~=php_arr3)
_index is a metamethod that can enable a retrieval of PHP array elements.
local php_arr=php.array( )
php_arr.foo='foo'
_accessing the element at key "foo" in "php_arr" triggers the_index metamethod
assert(php_arr.foo=='foo')
php_arr[1]='bar'
_accessing the element at index "1" in "php_arr" triggers the index metamethod
assert(php_arr[1]='bar')
_newindex is a metamethod that can enable a setting of PHP array elements.
local php_arr=php.array( )
--assigning value "foo" key "foo" in "std_obj" triggers the_newindex metamethod
php_arr.foo='foo'
assert(php_arr.foo=='foo')
--assigning value "bar" to index "1" in "std_obj" triggers the_newindex metamethod
php_arr[1]='bar'
assert(php_arr[1]='bar')
_tostring is a metamethod that can be used to customize a to string conversion with the tostring Lua function and can output a standard string "php-array: [array address]."
local php_arr=php.array(1)
--calling "tostring( )" on "php_arr" triggers the_tostring metamethod
assert(tostring(php_arr) "php-array: 0x1fx0ed08")
_gc is a metamethod that can be used to customize a garbage collection for the associated Lua PHP array.
In various examples, the binding module 118*a* and/or 118*b* can define a new PHP exception class referred to as LuaErrorException. This exception class can be derived from a default PHP exception class and can combine the Lua and PHP stack trace.
In various implementations, the PHP and Lua languages can be implemented in C language. For example, a core of PHP can be ZEND ENGINE, which can be written in C. The ZEND ENGINE can interpret PHP scripts, translate PHP code to opcodes, and/or consume the opcodes to do various operations. The ZEND ENGINE generally provides support for creating new extensions that support new requirements and needs. For example, a PHP Data Object (PDO) extension can define an interface for accessing a database in PHP. The binding module 118a and/or 118b can be or include a PHP extension that can add Lua and PHP interaction ability to PHP. Additionally or alternatively, given that Lua can be written in C, linking a Lua library against the binding module 118a and/or 118b when building the extension can result in the binding module 118a and/or 118b having access to Lua's low level C APIs.

Internally, Lua can maintain a Lua stack for exchanging data between Lua and C. Additionally or alternatively, a C LuaState instance can be created to wrap this stack. To exchange data and information with Lua in PHP code, the binding module 118a and/or 118b can represent the LuaState instance. The ZEND ENGINE can provide APIs and macros that can be used to create PHP classes in extension level C code. In some instances, therefore, a LuaState PHP class can exist in the binding module 118a and/or 118b to wrap a LuaState instance for accessing the Lua stack.

Because the ZEND ENGINE can also provide APIs and macros for creating member methods for given extension level PHP classes, several methods, described herein, have been added to LuaState to support various Lua operations. These LuaState APIs can serve as main entry points for the Lua operations, and can enable PHP to access Lua functionalities. As an example, LuaState::dostring( ) can accept a Lua code string as a parameter. This function can load a Lua chunk with LuaL_loadbuffer( ) and execute it with Lua_pcall( ).

In various examples, LuaState can provide entry points from PHP to Lua. To enable real interactions between PHP and Lua, PHP can be a Lua C library offered by the binding module 118a and/or 118b to access PHP resources like PHP class, functions, and global variables. PHP can be registered through the Lua C API LuaL_register and can contain a list of Lua C library functions.

In certain implementations, data can pass through entry points between PHP and Lua and/or can be exchanged between PHP and Lua. When LuaState or PHP APIs are called, for example, some of the APIs can accept parameters and/or can return values. For example, when the following Lua code is called through the LuaState::dostring( ) API, parameters and return can both be expected:

$lua_code="local arg= . . . print( . . . ), return {result='done'}"
$L=new LuaState;
$str="hello world";
$ret=$L->dostring($lua code, $str);

In various examples, when a PHP variable $str is passed to LuaState::dostring( ), the binding module 118a and/or 118b can push a copy of the PHP string to the Lua stack that is maintained by the LuaState instance $L. lua_pcall( ) can then be called to consume the compiled Lua code and the string parameter on the stack. lua_pcall( ) can push a return value to the stack, which can be retrieved by the extension to be passed to PHP.

A similar process can take place when parameters are passed from Lua to PHP and a return value is passed back to Lua. Whatever information is exchanged between Lua and PHP, the extension can serve as a proxy and can maintain the Lua stack on which the information is passed back and forth.

In general, Lua can support several data types, including: nil, boolean, numbers, strings, userdata, functions, threads, and tables. Likewise, PHP can support several data types, including: NULL, Boolean, integers, floating point numbers, strings, objects, resources, and arrays. PHP also has class and/or functions that can be represented in Lua. In various examples, Lua nil, Boolean, number, and/or string values can be pushed to PHP by creating a new zval and assigning or copying the Lua value to this new zval. Additionally or alternatively, the binding module 118a and/or 118b can contain an extension level LuaObject PHP class that can represent Lua function, thread, and table data types. To pass these data types to PHP, a Lua reference that references a value of these data types can first be created with the Lua C API LuaL_ref( ). A LuaObject instance can then be created that can wrap the new Lua reference. LuaObject class can have several additional functions that permit operations on the Lua function, thread, and/or table. PHP NULL, boolean, integer, floating point, and string data types can be pushed to Lua by copying a value to the Lua stack. Given that the address of a PHP function can be retrieved by a zend_is_callable ex( ) call, this C callable can then be pushed to Lua by pushing a C closure to Lua stack, so Lua can make the desired call. For PHP object, resource, array, and class data types, a Lua userdata value can be created on the Lua stack which points to a pointer address of the associated PHP value. The userdata type can be or include a Lua form for such types. Additionally or alternatively, metamethods can be set for the userdata value when the value is created, so that operations can be done for the value. For example, array userdata can have its index metamethod set, so that values can be retrieved from the PHP array in Lua. In some examples, a userdata value for PHP object, resource, array, and class can be passed back to PHP by pushing the value back to the Lua stack, and retrieving an original pointer address of the PHP value.

In various implementations, the binding module 118a and/or 118b can utilize or include a PHP extension with C language. The binding module 118a and/or 118b can be linked against the Lua library to access C level Lua APIs. A LuaState instance for the binding module 118a and/or 118b can wrap the Lua stack instance inside, so that data can be exchanged between PHP and Lua. In some examples, the binding module 118a and/or 118b can define various entry points with the help of ZEND ENGINE APIs and Lua APIs. Data can be pushed onto the Lua stack for crossing the PHP and Lua boundary. Most data can require some form of wrapping so that the data can be understood or interpreted by both languages.

Figure 6:
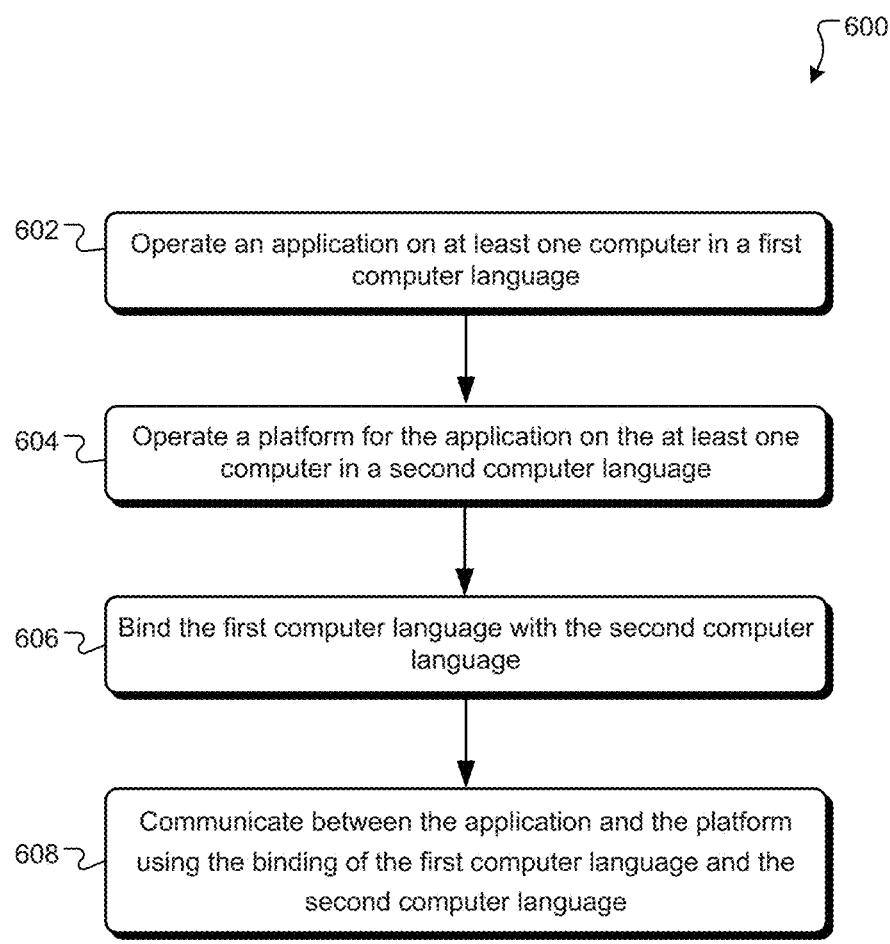
FIG. 6 is a flowchart of an example method of achieving communications between software applications written in different computer languages.

FIG. 6 illustrates an example computer-implemented method 600 of communicating between two computer programs written in different languages. An application is operated (step 602) on at least one computer in a first computer language. A platform for the application is operated (step 604) on the at least one computer in a second computer language. A binding or extension of the first computer language with the second computer language is achieved (step 606). The binding of the first computer language and the second computer language is used to communicate (step 608) between the application and the platform.

While much of the subject matter described herein relates specifically to the PHP and Lua computer languages, it is understood that the subject matter can also apply to other computer languages and combinations thereof. For example, certain implementations of the subject matter described herein can be used to achieve a binding of any two or more of the following computer languages: PHP, Lua, C, ERLANG, PYTHON, JAVA, RUBY, JAVASCRIPT, C#, OBJECTIVE-C, and SQL. Other computer languages are possible.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic disks, magneto-optical disks, optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse, a trackball, a touchpad, or a stylus, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method, comprising:
   communicating between an application on a first computer in a first computer language and the application on a second computer in a second computer language using a binding of the first computer language and the second computer language,
   wherein communicating between the application on the first computer and the application on the second computer comprises:
   executing a coroutine thread in one of the first and second computer languages; and
   tracking the coroutine thread in another one of the first and second computer languages.

2. The method of claim 1, wherein first computer comprises a server computer, and wherein the second computer comprises a client device.

3. The method of claim 1, wherein the first computer is configured to operate a platform for the application in the first language, and wherein the second computer is configured to operate the platform for the application in the second language.

4. The method of claim 3, wherein the platform on the first computer and the platform on the second computer are configured to facilitate communication between the application in the first language and the application in the second language.

5. The method of claim 3, wherein the platform on the first computer is configured to provide support for the application in the first language, and wherein the platform on the second computer is configured to provide support for the application in the second language.

6. The method of claim 1, wherein the first computer language comprises Lua, and wherein the second computer language comprises PHP.

7. The method of claim 1, comprising:
   binding the first computer language with the second computer language.

8. The method of claim 7, wherein binding the first computer language with the second computer language comprises:
   using the first computer language to extend the second computer language; and
   using the second computer language to extend the first computer language.

9. The method of claim 1, wherein tracking the coroutine thread in another one of the first and second computer languages comprises:
   recording an address of the coroutine thread in a managed stack data structure.

10. A system, comprising:
    one or more computer processors programmed to perform operations to:
    communicate between an application on a first computer in a first computer language and the application on a second computer in a second computer language using a binding of the first computer language and the second computer language,
    wherein to communicate between the application on the first computer and the application on the second computer the one or more computer processors are further programmed to:
    execute a coroutine thread in one of the first and second computer languages; and
    track the coroutine thread in another one of the first and second computer languages.

11. The system of claim 10, wherein first computer comprises a server computer, and wherein the second computer comprises a client device.

12. The system of claim 10, wherein the first computer is configured to operate a platform for the application in the first language, and wherein the second computer is configured to operate the platform for the application in the second language.

13. The system of claim 12, wherein the platform on the first computer and the platform on the second computer are configured to facilitate communication between the application in the first language and the application in the second language.

14. The system of claim 12, wherein the platform on the first computer is configured to provide support for the application in the first language, and wherein the platform on the second computer is configured to provide support for the application in the second language.

15. The system of claim 10, wherein the first computer language comprises Lua, and wherein the second computer language comprises PHP.

16. The system of claim 10, wherein the operations are further to:
  bind the first computer language with the second computer language.

17. The system of claim 16, wherein to bind the first computer language with the second computer language the one or more computer processors are further to:
  use the first computer language to extend the second computer language; and
  use the second computer language to extend the first computer language.

18. The system of claim 10, wherein to track the coroutine thread in another one of the first and second computer languages the one or more computer processors are further to:
  record an address of the coroutine thread in a managed stack data structure.

19. A non-transitory computer-readable medium having instructions stored thereon that, when executed by one or more computer processors, cause the one or more computer processors to:
  communicate between an application on a first computer in a first computer language and the application on a second computer in a second computer language using a binding of the first computer language and the second computer language,
    wherein to communicate between the application on the first computer and the application on the second computer the one or more computer processors are programmed to:
      execute a coroutine thread in one of the first and second computer languages; and
      track the coroutine thread in another one of the first and second computer languages.

* * * * *